Feb. 1, 1966    Z. J. LANSKY ET AL    3,232,312
SOLENOID OPERATED VALVE ASSEMBLY
Filed Dec. 20, 1961    2 Sheets-Sheet 2
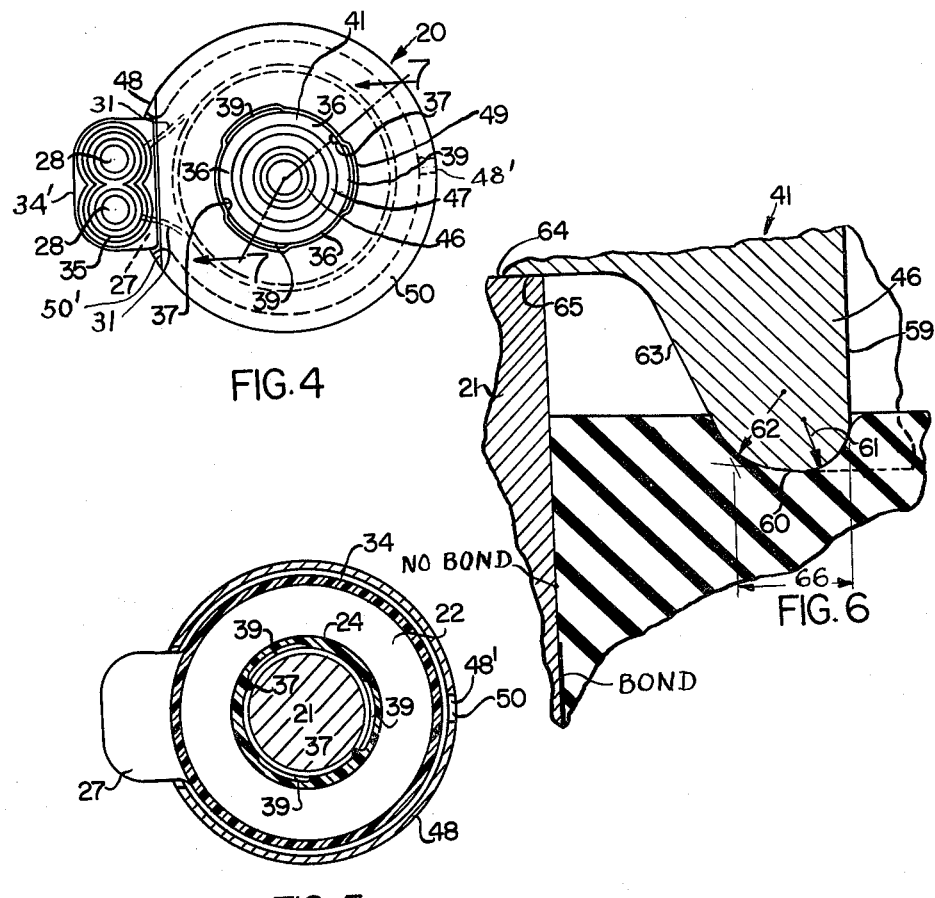
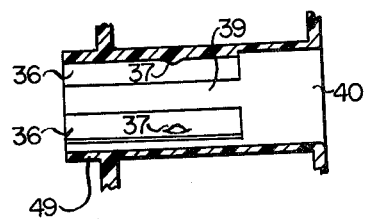
FIG. 7
INVENTORS
ZDENEK J. LANSKY
BY KURT W. LEIBFRITZ
John N. Wolfram
ATTORNEY

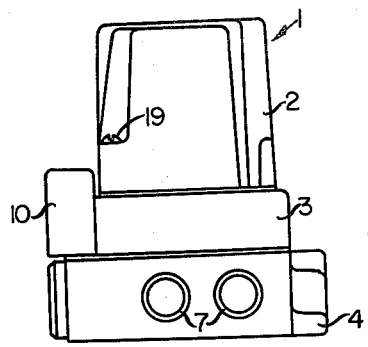
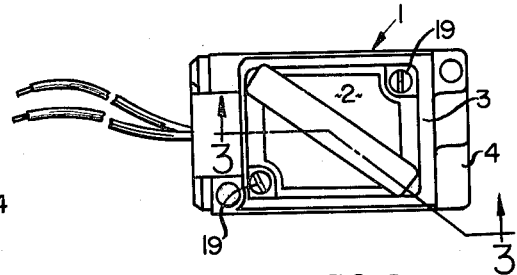
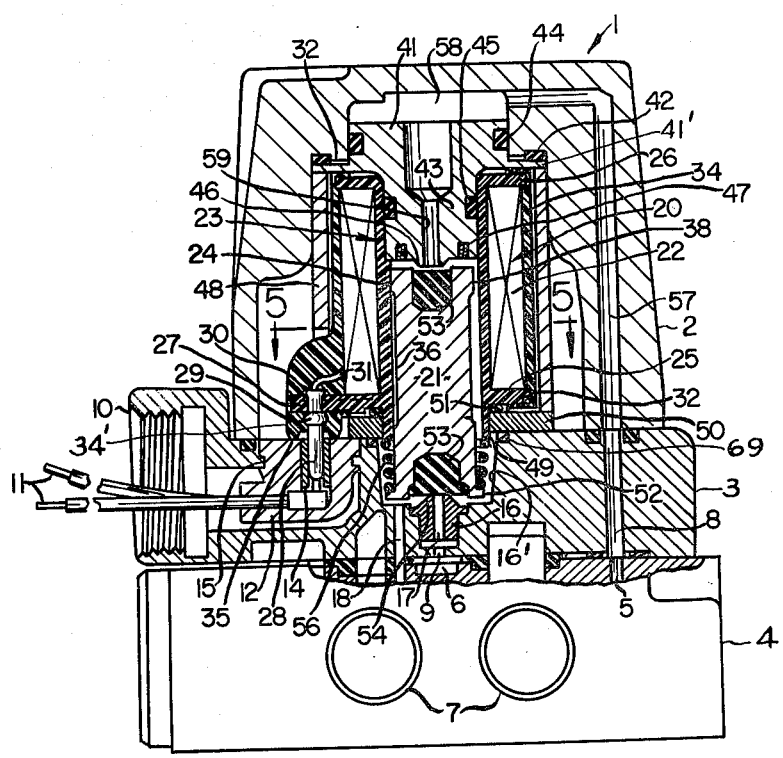

3,232,312
SOLENOID OPERATED VALVE ASSEMBLY
Zdenek J. Lansky, Winnetka, and Kurt W. Leibfritz, Norridge, Ill., assignors to Parker-Hannifin Corporation, Cleveland, Ohio, a corporation of Ohio
Filed Dec. 20, 1961, Ser. No. 160,808
22 Claims. (Cl. 137—315)

The present invention relates generally as indicated to a solenoid operated valve assembly.

It is an object of this invention to provide a solenoid valve in which various of the solenoid and valve parts may be loosely assembled with respect to each other but are held in fixed positions by resilient members in such a way that close tolerances in the machining or other forming of the parts is obviated.

Another object is to provide a solenoid valve assembly in which certain of the parts forming the flux path are not permanently attached to each other but are firmly held in constant contact with each other by means which makes close dimensioning of the parts unnecessary.

Another object is to provide a solenoid valve in which resilient members which hold loose parts of the solenoid in properly assembled relation also serve as seals against leakage of fluid.

Another object is to provide a solenoid valve with loosely assembled solenoid and valve parts which are held in proper assembled relation by resilient means and assisted by fluid pressure.

Another object is to provide a valve of the type described in which there is a means for yieldably retaining the solenoid armature within the solenoid coil when the coil is removed from the valve housing.

Another object is to provide a solenoid valve in which the solenoid coil is encapsulated in plastic and in which terminal pins for the coil are securely anchored within the plastic.

Another object is to provide a plastic bobbin for the solenoid of a solenoid operated valve in which the bobbin provides lands for guiding the armature and grooves to provide a flow path past said armature.

Another object is to provide a solenoid valve with a novel form of valve seat for enhancing the sealing characteristics and fatigue life thereof.

It is another object of this invention to provide a solenoid operated valve assembly of the character indicated in which the solenoid coil is hermetically sealed in a plastic or like insulating casing having an integral boss terminating in a plug-in connection to an electric power source and including novel means for sealing the complemental plug-in elements.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 1 is a side elevation view of a solenoid operated valve assembly embodying the present invention;

FIG. 2 is a top plan view of the valve assembly of FIG. 1;

FIG. 3 is a cross-section view taken substantially along the line 3—3, FIG. 2, showing the details of internal construction of the solenoid operated pilot valve assembly;

FIG. 4 is an elevation view as viewed from the plug end of the solenoid (omitting the armature) showing the flux sleeve therearound and the flux plate at one end;

FIG. 5 is a transverse cross-section view taken substantially along the line 5—5, FIG. 3;

FIG. 6 is a much enlarged detail showing the unique formation of the seats with which the rubber-like elements of the pilot valve cooperate to open and close the flow passages in valve assembly; and FIG. 7 is a fragmentary longitudinal section view of the solenoid bobbin.

Referring now more particularly to the drawings, and first to FIGS. 1, 2, and 3, the solenoid operated pilot valve assembly 1 herein comprises a two-part housing 2; 3 which is adapted to be secured to a main control valve block 4 having on its rear side pressure supply and exhaust ports (not shown) having pressure passage 6 and exhaust passage 5. On the front side of said block are two cylinder ports 7; 7 for connection, for example, to the ports of a double acting fluid motor. Movable in said valve block is a directional control valve member (not shown) such as contemplated in the patent to F. W. Hicks Jr., 2,754,840, dated July 17, 1956. For example, the control valve member may have a plunger portion which, when exposed to fluid under pressure, shifts said valve member to communicate one port 7 with inlet passage 6 and the other port 7 with exhaust passage 5, and which, when vented, permits a spring to urge the valve member to reverse the connection of the ports 7; 7 with respect to the inlet and exhaust ports.

In the particular example shown, the solenoid operated valve assembly 1 is of the four-way, two position type in which the main control valve member is pilot operated. In other words, when the solenoid is energized, air pressure from the valve block 4 passes through the pilot valve in housings 2 and 3 to actuate the main control valve member in one direction. When the solenoid is deenergized, the air pressure thus acting on the main control valve member is exhausted through the pilot valve for spring actuation of the valve member in the other direction. It is, of course, to be understood that the valve block 4 may contain different forms of control valve members with more than two positions and arranged, for example, for actuating one or more double acting fluid motors, or one or more single acting fluid motors. In addition, and as hereinafter described, although the present valve assembly 1 is of a type with maintained contact solenoid actuation, one or more solenoids may be disposed as disclosed in the aforesaid Hicks Jr. patent, to require only momentary energization of a solenoid to effect maintenance of the main control valve member in desired actuated position.

As aforesaid, the solenoid operated valve assembly 1 herein comprises a two-part housing 2; 3 of which the housing 3 is secured directly on the valve block 4 with an intervening gasket which isolates registering pressure passages 6 and 9 from the registering exhaust passages 5 and 8. On one side of the housing 3 is a port 10 for connection of an electric power supply line to the leads 11, the receptacle 12 being molded of rubber-like material with metal contact sleeves 14 molded therein. The receptacle 12 has an external groove in which is snapped the rib 15 for retaining the receptacle in housing 3. At the center of said housing is a recess 16' which has a seat member 16 in the bottom thereof, said seat member having a passage 17 therethrough which communicates with pressure passage 9.

The passage 18 in housing 3 leads to the fluid pressure actuating mechanism in the valve block 4 whereby fluid under pressure is either supplied thereto for actuating the main valve in one direction or vented therefrom to permit spring actuation of the main valve in the other direction.

Detachably secured to housing 3 as by means of the screws 19, is the solenoid housing 2 which contains therein the solenoid 20 and the armature 21, the latter being a pilot valve member as hereinafter described.

Referring now in detail to the solenoid 20 and its mounting between the housings 2 and 3, and to the details of the pilot valve 21 actuated by the solenoid, references may be had especially to FIGS. 3, 4, and 5. As shown, the solenoid coil 22 is wound on a bobbin 23 comprising a tubular hub 24 with flanges 25 and 26 at its ends, said bobbin being molded of plastic material such as nylon, for example. One flange 25 has a radially extending portion 27 to which the cylindrical contact pins 28; 28 are secured as by providing on each pin on opposite sides of the flange a rib 29 and an upset head 30. The leads 31; 31 of the coil 22 are soldered or otherwise secured to heads 30, one of the leads 31 being the beginning of coil 22 and the other the finish.

The bobbin 23 is provided with a plurality of concentric serrations 32 of saw-tooth form on the outer sides of the respective flanges 25 and 26. The bobbin 23 with the coil 22 wound thereon and with the beginning and finishing leads 31 secured to the respective pins 28, is then placed in a mold for molding therearound a shell 34 also of plastic material such as nylon. The shell 34 interlocks with serrations 32 and includes a radially projecting enlargement 34' which surrounds radial portion 27, pins 28 and leads 31, whereby the contact pins 28 and wire leads 31 are firmly anchored and embedded in the completed and encapsulated solenoid 20. Enlargement 34' has an axially projecting figure-eight rib 35 around the contact pins 28, whereby when the housing 2 is mounted on the housing 3, the rib 35 is embedded in the rubber-like socket 12 to seal the contact pins 28 therewithin and also to provide a dielectric barrier around the pins 28 to more effectively insulate the same from each other and thus permit closer spacing from each other.

The interior bore of the bobbin 23 has three equally spaced longitudinally extending cylindrical guide lands 36 for the solenoid armature 21 and, in addition, two of the lands 36 are provided, as shown, with inwardly extending armature retaining nubs 37. The bobbin 23, being of plastic such as nylon, yields a slight amount radially to permit forcing of collar 38 past nubs 37. In assembling the armature in the solenoid 20, it is pushed up until the head or collar 38 which is of larger diameter than the intermediate portion of the plunger, moves past the nubs 37, whereby the armature 21 is thus yieldably retained in the solenoid 20 when the housing 2 is detached from the housing 3, and also when the solenoid 20 is removed from said housing 2. Between lands 36 the bore of the bobbin is enlarged or grooved as at 39 to provide fluid passages around the armature 21 as to be presently described. Lands 36 terminate short of the upper end of the bobbin to provide an uninterrupted cylindrical bore portion 40 on the same diameter as grooves 39.

Seated in the housing 2 is a top seat member 41 which has an O-ring or like packing 44, to establish a fluidtight joint with the housing 2. Between housing 2 and the flange 41' of said seat member 41 is a resilient ring 42, as of rubber-like material for example. The seat member 41 has a cylindrical pilot portion 43 which fits in bore portion 40 of bobbin 23, an O-ring 45 or the like being employed to seal the joint between the pilot 43 and the bobbin. The lower end of the seat member 41 is formed with a seat 46 of the same type as on the bottom seat member 16 and, in addition, there is a shading coil 47 disposed in an annular groove around said seat 46. Around the encapsulated solenoid 20 is a flux sleeve 48 which is notched to clear the radially extending plug portion 27 and which is longitudinally split as shown as 48'.

Projecting from the lower end of the bobbin 23 is a lip portion 49 of substantially uniform wall thickness. Since lands 36 and grooves 39 extend the full length of the lip the outside diameter of the lip 49 is noncircular, as shown in FIG. 4. Fitted over lip portion 49 is a flux plate 50 having a non-circular opening conforming to and slidably receiving the non-circular outer diameter of lip 49 so as to be non-rotatable thereon. The flux plate is cut away on one side as at 50' to clear the figure 8 shaped rib 35, the non-circular engagement of the lip 49 with the flux plate preventing rotation of the flux plate whereby the cutaway portion 50' might engage and damage rib 35. A packing 69 seals flux plate 50 with respect to body 3. Between bobbin flange 25 and flux plate 50 is a resilient ring 51, preferably of rubber-like material, which acts as a fluid seal between bobbin 23 and flux plate 50 and also as a spring for keeping the encapsulated solenoid coil 20 in a fixed upper portion against flange 41' of seat member 41. Without resilient member 51 serving as a spring in this manner it would be necessary to have the encapsulated solenoid coil 20 of precisely the same length as flux sleeve 48 to prevent either the coil or flux sleeve from being loose in an endwise direction in the assembly. This would require extremely close control of dimensions during manufacture. Resilient member 51 makes up for dimensional variations and obviates such close control. Also, resilient member 51 does not exert as much force as resilient member 42 whereby the latter is effective for keeping seat member 41, flux sleeve 48, and flux plate 50 in constant tight contact.

Likewise, resilient ring 42 is compressed between housing 2 and the flange of seat member 41 so as to act as a spring to keep seat member 41, flux sleeve 48, flux plate 50, and body 3 successively in tight contact so that none of the parts will be loose within the housing 2 and without having to maintain close tolerances in the axial length of flange 41', flux sleeve 48, and flux plate 50 with respect to the depth of the solenoid receiving recess in the housing 3, it being noted that the bottom of housing 2 intimately engages housing 3.

Armature 21 has a flange 52 at its lower end and has inserts 53 of rubber-like material at its ends with plane faces inset from the annular ends for engagement with the respective seats 46 and 54. The armature 21 is biased by the tapered coil spring 56 to normally cause the bottom rubber-like element 53 to engage the seat 54. However, the force of spring 56 is not sufficient, when housing 2 and solenoid coil 20 are removed from housing 3, to cause collar 38 to be forced past nubs 37 whereby armature 21 will at such time remain within coil 20.

When the solenoid coil 20 is deenergized and the armature 21 is seated against lower seat member 54 by spring 56, as shown in FIG. 3, pressure fluid in passages 6 and 9 is cut off. At the same time, passage 18, which as previously mentioned leads to an actuating surface on the valve plunger within housing 4, is open to exhaust passage 5 via recess 16', grooves 39, bore 59, chamber 58, and bores 57 and 8

Upon energization of solenoid 20, armature 21 is raised to open seat member 54 and close seat member 46. This directs fluid under pressure from passages 6 and 9 through seat member 54 to recess 16', passage 18, and then to the actuating surface of the valve plunger within housing 4.

In other applications of the solenoid pilot valve, passage 8 may be connected to pressure passage 6 instead of to exhaust passage 5 and passage 9 may be connected to exhaust passage 5 instead of to pressure passage 6. In such event, armature 21, when the coil is deenergized, feeds pressure fluid to passage 18 via passages 8, 57, 58, 59, 39 and recess 16', and when the coil is energized closes off the pressure fluid at seat member 46 and opens passage 18 to exhaust port 5 via recess 16', seat member 54 and passages 17 and 9.

This latter arrangement has an advantage in that seat member 41 is then at all times urged downward by a differential of fluid pressures to assist resilient member 42 in holding seat member 41, flux sleeve 48 and flux plate 50 together and against body 3. Thus when the armature 21 is against lower seat member 54, pressure fluid in chamber 58 acts downwardly on seat member 41 on an area determined by packing 44 while fluid pressure within bobbin 23 and recess 16' acts upwardly on an area determined by packing 69. This latter area is less than the area subject to downward pressure and hence there is a net force tending to urge member 41 downwardly.

When the solenoid is energized in this alternate arrangement so as to seat armature 21 on seat 46, there is no pressure fluid acting upwardly on member 41 and the latter is urged downwardly by the full force of pressure fluid acting on the upper surface of member 41 as determined by packing 44.

As shown in FIGS. 3 and 6, upper valve seat 46 comprises a circular rib which has a .005" radius 61 tangent with the wall of passage 59 and tangent to a 5° tapered annular end face 60. The outer corner of the rib has a .010" radius 62 tangent to end face 60 and a 25° tapered outer wall 63. Rubber-like insert 53 in armature 21 has a plane transverse face for engagement with seat rib 46, such face being inset about .020" from end face 64 of the armature.

Rib 46 projects about .030" from seat face 65 and has a width at 66 of .015". With these proportions and contour, rib 46 will initially engage insert 53 with a line contact near the tangent point between the inner radius 61 and tapered face 60 to establish initial sealing with high unit pressure. The contact area then quickly widens to prevent excessive unit pressure and then widens at a slower rate when contact with radiused outer corner 62 is established. Rib 46 will embed about .010" in insert 53 and then armature face 64 will stop against face 65 and be held against such face by the alternate pull forces from coil 20 and shading coil 47 to provide hum free operation with effective sealing.

The construction of rib 46 as just described permits sufficient distortion of rubber-like insert 53 to permit the desired metal to metal contact at 64; 65 and yet permit high enough unit pressure on insert 53 for efficient sealing but not high enough to overstress the rubber so as to cause breakdown and short life for the same. It has been found that this particular form of seat structure has a fatigue life of over thirty million cycles, whereas with a seat structure having, for example, a curved seat of .010" radius without the tapered portion 60, has only a fatigue life of about five million cycles, at which time the rubber-like elements commence to crack, split, crumble and otherwise fail.

Since there is no magnetism involved in seating armature 21 on lower seat member 16 there is no necessity to have metal to metal contact and the same is preferably omitted. To control proper stressing of the rubber-like insert 53 so as to obtain efficient sealing with maximum life, seat face 54 is formed in either of two manners, depending upon the direction in which fluid pressure is directed through the solenoid valve.

If port 6 is the pressure inlet and port 5 the exhaust, pressure in passage 17 tends to lift armature 21 against spring 56. In such case seat 54 is tapered 60° from the vertical and rounded .005" adjacent passage 17 and a relatively heavy spring 56 is used for applying the desired seating pressure to the armature in opposition to the unseating force of pressure fluid in port 17.

If port 6 is the exhaust and 5 the pressure inlet, pressure fluid entering the armature chamber through port 59 when the solenoid is deenergized acts on the armature to augment the force of spring 56 to seat the armature on lower seat member 16. To compensate for this situation spring 56 is made lighter and seat rib 54 is made at an angle of about 75° and likewise rounded to .005" radius.

Thus by changing the spring pressure and the seat angle relatively the same sealing force is applied to insert 53 regardless of the direction of flow through the valve and the sealing force is so controlled as to avoid detrimental overstressing of the rubber-like material. In either case the area of seat 54 which is subject to engagement with insert 53 is greater than the maximum contact area of rib 46 with the same amount of travel of the armature after initial contact by the respective insert 53.

As a still further feature the inserts 53 are bonded in the armature 21 except for the first 1/16" from the plane end faces thereof so as to permit more readily the deforming of the rubber during embedding of the ribs 46; 54 therein.

Other modes of applying the principle of the invention may be employed, change being made as regards the details described, provided the features stated in any of the following claims, or the equivalent of such, be employed.

It is therefore particularly pointed out and distinctly claimed as invention:

1. In a solenoid operated valve assembly, a housing, a bobbin within said housing for supporting a solenoid coil, a central opening through said bobbin, an armature comprising a valve element movably mounted within said opening, and yieldable means for retaining said armature within said bobbin when the coil is removed from said housing.

2. The assembly of claim 1 in which said bobbin is of yieldable plastic material and said yieldable means includes projections within said opening engageable with a portion of said armature.

3. The assembly of claim 1 in which said armature is urged toward one end of the bobbin by a spring, said spring having insufficient force for overcoming said yieldable means when said coil is out of said housing.

4. In a solenoid operated valve assembly, a solenoid for actuating an armature serving as a valve member, said solenoid including a bobbin for a coil, said bobbin having a radially extending flange at one end thereof, a pair of terminal pins connected to said coil and extending through holes in said flange and having enlargements on opposite sides of said flange for anchoring said pins firmly thereto, and a plastic shell around said coil, a portion of said shell surrounding said enlargements for housing the same.

5. The assembly of claim 4 in which said shell portion includes a projecting annular rib surrounding each pin and engageable with a female electrical receptacle adapted to receive said pins.

6. In a solenoid operated valve, first and second housing members providing a cavity therebetween, a solenoid coil in said cavity, a valve seat member loosely mounted in one end of the cavity and in engagement with one end of the coil, a flux plate loosely mounted in the other end of the cavity between the coil and said second housing member, passage means for introducing fluid under pressure into said one end of said cavity, passage means for allowing fluid to escape from said other end of said cavity, a flow passage through said seat member and said coil communicating with the ends of said cavity, an armature movably mounted in said flow passage for opening and closing the same, first annular sealing means engaging said coil and flux plate, second annular sealing means engaging said flux plate and said escond housing member, third annular sealing means engaging said valve seat member and said coil, and fourth annular sealing means engaging said seat member and said first housing member, said fourth sealing means defining an area on said seat member subject to fluid pressure in said cavity for successively urging said seat member, coil, and flux plate toward said second housing member, said first, second, and third sealing means defining areas on said seat member, coil, and flux plate subject to fluid pressure within said cavity for urging said seat member, coil, and flux plate toward said first housing member, the total of said last mentioned areas being less than said first mentioned area whereby said seat member, coil, and flux plate are constantly urged toward said second housing by fluid pressure within said cavity.

7. In a solenoid operated valve, a seat member, a valve member movable toward and away from said seat member; one of said members having a seat in the form of a circular rib having at least one tapered side surface; the other member having a rubber-like element with a plane face to move into and out of sealing engagement with said seat; said rib having an annular flat end surface which surface is at an acute angle to the plane face of the rubber-like element and which initially has line contact with said element and which progressively spreads out to wide surface contact as said members are urged together under increasing force; the radially outer and inner corners of said rib being radiused tangent to such flat end surface.

8. The valve seat structure of claim 7 in which said valve member engages a positive stop to limit further travel of the valve member toward the seat member when substantially all of the radiused portion of said rib has become embedded within said rubber-like element.

9. The valve seat structure of claim 7 wherein said other member has a cavity therein for receipt of said rubber-like element, said rubber-like element being bonded within said cavity remote from said plane face and being unbonded therein adjacent said plane face.

10. In a solenoid operated valve assembly, first and second housing members defining a cavity therebetween, a solenoid coil within said cavity, a flux sleeve surrounding said coil, a seat member at one end of the coil and having a part extending between the first housing member and the flux sleeve, a fluid flow passage through said coil and seat member, an armature movable in said coil for opening and closing said passage, a first resilient member between said seat member and said first housing member for urging said seat member and said flux sleeve toward said second housing member, and a second resilient member at the other end of the coil urging the same against said part.

11. The assembly of claim 10 in which there is a loose flux plate between the other end of said flux sleeve and said second housing member, said second resilient member being disposed between said flux plate and said coil for urging said coil toward said part, said first resilient member being adapted to exert a greater force than said second resilient member whereby contact between said flux sleeve and said seat member is maintained and said flux plate is urged against said second housing by said flux sleeve.

12. The assembly of claim 11 in which said second resilient member also establishes a fluid seal between said flux plate and said coil.

13. The assembly of claim 11 in which said flux plate is keyed to said coil to prevent relative rotation therebetween.

14. A solenoid operated assembly comprising a housing containing a solenoid coil, said coil being mounted on a plastic bobbin having a central opening therethrough, said opening having a cylindrical portion at one end and land and groove portions extending from adjacent said cylindrical portion toward the other end, a member in said cylindrical portion having a loose sealed fit therein, and an armature movable in said opening, said armature having cylindrical collar engageable with said land portion for guiding said movement thereof, said groove portion serving as a flow passage for fluid through said opening and past said collar.

15. The assembly of claim 14 in which said bobbin has a nub in said opening extending radially inward and engageable with one end of said collar for preventing accidental displacement of said armature from said opening.

16. In a solenoid valve, a housing, a solenoid coil associated with said housing, said solenoid coil being supported by a bobbin, first and second valve seat members, one at each end of said coil, said first seat member having a projecting rib and an adjacent contact face, said second seat member having a conical face, an armature axially movable in said bobbin, yieldable means for retaining said armature within said bobbin when said coil is removed from said housing, said armature having a first distortable element with a stop surface adjacent thereto and having a second distortable element, said armature being movable upon energization of said coil to a first position with said first element engaged and distorted by said rib and with said contact face against said stop surface for limiting said distortion upon engagement of a predetermined area of said rib with said element due to a predetermined amount of movement of said armature toward said rib after initial contact therewith, means effective upon deenergization of said solenoid for applying force to said armature for moving the same to a second position with said second second element engaged and distorted by said conical face, said conical face having a larger area engageable with said second element than said predetermined rib area upon the same amount of movement of said armature toward said face after initial contact therewith as said predetermined amount.

17. The assembly of claim 16 in which said first seat member has at least one tapered side surface which is at an acute angle to said first distortable element and an annular flat end surface which initially has line contact with said first distortable element of said valve member and which progressively spreads out to wide surface contact as said valve member is urged against said first seat member under increasing force; the radially outer and inner corners of said rib being radiused tangent to such flat end surface.

18. In a solenoid operated valve assembly, a housing, a bobbin within said housing for supporting a solenoid coil, a central opening through said bobbin, an armature movably mounted within said opening, and yieldable means for retaining said armature within said bobbin when said coil is removed from said housing, said bobbin having a radially extending flange at one end thereof in which said solenoid coil has a pair of terminal pins connected thereto and extending through holes in said flange with enlargements on said pins on opposite sides of said flange for anchoring said pins firmly thereto, and in which a plastic shell surrounds said coil, said shell having a portion thereof surrounding said enlargements.

19. The assembly of claim 18 in which said bobbin has a lip portion extending beyond said radially extending flange, and a flux date slidably but non-rotatably disposed on said lip portion, said flux plate having a cut away portion on one side thereof to clear that portion of said plastic shell surrounding said pin enlargements.

20. The assembly of claim 18 in which said radially extending flange is provided with serrations on the outer side thereof, said plastic shell being interlocked with said serrations.

21. In a solenoid operated valve assembly, a housing having a cavity therein, a seat member loosely mounted in one end of said cavity, a cylindrical member loosely mounted in said cavity between a portion of said seat member and the other end of said cavity, a resilient member at the other end of said cavity urging said cylindrical member to a fixed position against said seat member and said seat member toward said one end of said cavity, a valve member movable in said cylindrical member toward and away from said seat member, one of said seat and valve members having a seat in the form of a circular rib having at least one tapered side surface and the other having a rubber-like element with a plane face for movement into and out of sealing engagement with said seat, said rib having an annular flat end surface which surface is at an acute angle to the plane face of the rubber-like element and which initially has line contact with said element and which progressively spreads out to wide surface contact as said members are urged together under increasing force, the radially outer and inner corners of said rib being radiused tangent to said flat end surface.

22. In a solenoid operated valve assembly, a housing having a cavity therein, a seat member loosely mounted in one end of said cavity, a solenoid coil loosely mounted in said cavity between a portion of said seat member and the other end of said cavity, a flux sleeve surrounding said coil and a flux plate at the other end of said cavity, means mantaining said flux sleeve in contact with said seat member and said flux plate, and a resilient member at the other end of said cavity between said coil and flux plate urging said coil to a fixed position against said seat member and said seat member toward said one end of said cavity.

References Cited by the Examiner

UNITED STATES PATENTS

| | | | |
|---|---|---|---|
| 2,449,438 | 9/1948 | Wisegarver | 251—129 X |
| 2,546,325 | 3/1951 | Wasserlein | 251—139 |
| 2,616,452 | 11/1952 | Clay | 251—139 |
| 2,619,116 | 11/1952 | Ralston | 251—139 XR |
| 2,619,986 | 12/1952 | Goepfrich | 251—129 |
| 2,853,659 | 9/1958 | Herion | 317—191 |
| 2,860,850 | 11/1958 | Rhodes | 251—139 |
| 2,861,594 | 11/1958 | Collins | 251—141 |
| 2,909,713 | 10/1959 | Hambor | 317—165 |
| 2,955,617 | 10/1960 | Collins | 137—623 |
| 2,963,267 | 12/1960 | Bancroft | 251—333 |
| 2,966,168 | 12/1960 | Hunt | 251—139 XR |
| 2,969,218 | 1/1961 | Shaw | 251—333 |
| 2,988,675 | 6/1961 | Bancroft | 317—191 |
| 2,993,149 | 7/1961 | Persons | 317—165 |
| 3,002,532 | 10/1961 | Carlson | 137—623 |

FOREIGN PATENTS

| | | |
|---|---|---|
| 224,907 | 3/1959 | Australia. |
| 818,723 | 8/1959 | Great Britain. |
| 1,181,744 | 1/1959 | France. |

M. CARY NELSON, *Primary Examiner.*

ISADOR WEIL, MARTIN P. SCHWADRON,
*Examiners.*